US005853955A

United States Patent [19]

Towfiq

[11] Patent Number: 5,853,955

[45] Date of Patent: Dec. 29, 1998

[54] SUBSTRATES AND METHODS FOR LASER MARKING SAME

[75] Inventor: Foad Towfiq, Oceanside, Calif.

[73] Assignee: McDonnell Douglas Corp., Long Beach, Calif.

[21] Appl. No.: 570,634

[22] Filed: Dec. 11, 1995

[51] Int. Cl.[6] ........ G02B 6/44

[52] U.S. Cl. ........ 430/270.12; 430/945; 219/121.67; 219/121.68; 219/121.7

[58] Field of Search ........ 430/945, 270.12; 219/121.67, 121.68, 121.7

[56] References Cited

U.S. PATENT DOCUMENTS

| | | | |
|---|---|---|---|
| 3,314,795 | 4/1967 | Dorion et al. | 430/947 |
| 3,859,089 | 1/1975 | Chambers | 430/947 |
| 3,861,919 | 1/1975 | Stein | 430/947 |
| 4,188,214 | 2/1980 | Kido et al. | 430/270.12 |
| 4,334,933 | 6/1982 | Abe et al. | 106/305 |
| 4,375,373 | 3/1983 | Abe et al. | 106/308 B |
| 4,383,029 | 5/1983 | Yamada et al. | 430/270.12 |
| 4,808,966 | 2/1989 | Ferlier et al. | 219/121.68 |
| 5,030,551 | 7/1991 | Herren et al. | 430/945 |
| 5,091,284 | 2/1992 | Bradfield | 430/945 |
| 5,111,523 | 5/1992 | Ferlier et al. | 430/945 |
| 5,130,721 | 7/1992 | Sukhman | 219/121.68 |

FOREIGN PATENT DOCUMENTS 860802 4/1986 South Africa .

OTHER PUBLICATIONS

Colour Index Third Ed., vol. 4, pp. 4651–4689 and 5376, 1971.

*Primary Examiner*—Martin Angebranndt
*Attorney, Agent, or Firm*—Donald E. Stout; Frank J. Uxa, Jr.

[57] ABSTRACT

Substrates suitable for being marked by light energy from a laser are disclosed. Such substrates include a base substrate component and a filler pigment component coupled to the base substrate component and including a combined metal component and a glass forming component other than the combined metal component. The filler pigment component is present in an amount effective to, as a result of exposing the substrate to light energy from a laser, produce a colored glass-like pigment component coupled to the base substrate component having a contrasting color relative to the filler pigment component. Markings, for example, on electrical wire insulation, having higher contrast and greater durability are advantageously provided.

1 Claim, No Drawings

SUBSTRATES AND METHODS FOR LASER MARKING SAME

BACKGROUND OF THE INVENTION

The present invention relates to pigmented substrates and methods for laser marking same. More particularly, the invention relates to pigmented substrates which, upon exposure to light energy from a laser, are provided with markings, preferably colored markings, having enhanced properties.

Insulated electrical wires usually require identification, such as labeling or other identification markings, at predetermined distances along the length of the wire. For example, in the aircraft industry it is typical to require labeling or other identification marking of wires at intervals of approximately three inches to facilitate testing, circuit tracing, and repairs in the event a fault is detected. Individual aircraft require miles of such electrical wiring so that the labeling or other identification marking should be done in a convenient and reproducible manner.

Three conventional methods for wire marking are: hot stamping; inkjet printing; and dot matrix printing. Hot stamping can potentially damage the wire insulation; the inkjet method utilizes harmful chemicals; and dot matrix printing often requires post curing, such as ultra violet or oven curing. Also, the legibility of the marks produced using any of these methods is often less than satisfactory and relatively poor adherence of the ink to the surface of the wire is often obtained.

Another approach that has been used is laser marking of a pigmented wire. This approach, in which the pigment is discolored by laser energy, is effective when the wire is insulated by a polyfluorocarbon material, for example, Teflon®, and $TiO_2$ is included in the pigment. This approach is not completely satisfactory because $TiO_2$ does not produce a high contrast mark. An additional problem exists because lasers effective to discolor $TiO_2$ often operate in the ultraviolet (UV) range. Therefore, such lasers cannot be used when the wires are insulated using materials that are not transparent to the UV light, for example, polyimides. Also, the UV radiation may not be effectively transmitted to the pigment so that the pigment discoloration is inhibited.

Another approach that has been suggested in the past is marking photochromic substrates, that is substrates pigmented with photochromic pigments, with light energy. However, at least one problem exists with regard to the conventional marking of photochromic substrates with laser light. The photochromic substrate discoloration is due to a photochemical reaction which is often reversible so that over time, if the rate of reverse reaction is fast, the marking fades. Further, if the rate of reverse reaction is slow, over time due to ambient light, the portion of the electrical insulation which is not exposed to laser energy also discolors. In short, laser marking of a photochromic substrate, although initially effective to label or otherwise identify electrical wires, ultimately results in markings which are difficult, if not impossible, to read after a period of time. This, of course, is unacceptable, for example, in the aircraft industry where insulated electrical wiring is employed on a long term basis.

It would be advantageous to provide an effective and long lasting marking system for substrates, such as insulated electrical wires and cables.

SUMMARY OF THE INVENTION

Substrates useful for being marked by light energy from a laser and methods for laser marking substrates have been discovered. The present substrates include filler pigment components which have enhanced color and/or contrast and/or color stability relative to conventional pigmented substrates. Thus, the present systems produce substrate markings which are more easily detectible and which remain easily readable on the substrate for long periods of time. In addition, the present systems often require a reduced amount of laser light energy so that the markings can be obtained on substrates made of a large variety of materials without destroying or otherwise adversely affecting the substrates. Reducing the amount of laser light energy required for marking in accordance with the present invention significantly reduces the cost of marking aircraft electrical wires and makes other applications, such as ink-less laser printing in the office environment, of the present invention feasible.

The present pigmented substrates are not photochromic in that they can be permanently discolored by other than photochemical reactions. The present substrates are preferably discolored by a photo-thermal effect. Without wishing to limit the invention to any particular theory of operation, it is believed that this photo-thermal effect provides for heat generated in the pigment by absorption of light energy to cause the pigment component to form a glass or glass-like component or complex having a different or contrasting color, thereby permanently discoloring the substrate. The present pigmented substrates, unlike the prior art photochromic substrates, are such that a threshold amount of light energy or light fluence is often required before any discoloration of the pigmented substrate occurs. Thus, for example, no matter how long the present pigmented substrates are subjected to ambient light, substantially no discoloration will occur. This feature enhances the long term usefulness of the markings on the present substrates.

In one broad aspect of the present invention, substrates suitable for being marked by light energy from a laser are provided. Such substrates include a base substrate component, for example, polymeric materials such as those conventionally used to insulate electrical wires, polymeric films, papers, other print media and the like. A filler pigment component is coupled to the base substrate component and includes a combined metal component and a glass forming component other than the combined metal component. The filler pigment component is present in an amount effective to, as a result of exposing the substrate to light energy from a laser, produce a colored, for example, contrasting with the unexposed filler pigment component, glass-like pigment component coupled to the base substrate component. It is preferred that the filler pigment component include at least 10% by weight of silica in the event that the filler pigment component includes silica and at least 80% by weight of titanium oxide.

The colored glass-like pigment component preferably has enhanced color stability relative to the color stability produced as a result of identically exposing to light energy from a laser a substantially identical substrate including the filler pigment component without the glass forming component. Without wishing to limit the invention to any particular theory of operation, it is believed that the glass forming component is combined in the colored glass-like pigment component to provide a substantially permanent or irreversibly formed pigment material which is not substantially susceptible to being destroyed or otherwise disadvantageously altered as a result of being exposed to ambient conditions, for example, ambient light conditions and/or ambient oxygen concentrations.

In a preferred embodiment, the colored glass-like pigment component has darker color and higher contrast relative to the color and contrast produced as a result of identically exposing to light energy from a laser a substantially identical substrate including a filler pigment component without the glass forming component.

In a particularly useful embodiment, the glass-like pigment component provides a contrasting color relative to the filler pigment component which is at least about 60%, more preferably at least about 70%, and still more preferably at least about 80% of the maximum potential contrasting color obtainable from the filler pigment component. This glass-like pigment component is preferably obtained using an amount of laser light energy which has substantially no detrimental effect on the base substrate component, for example, the polymeric base substrate component. This feature of the present invention, that is the formation of relatively high contrast glass-like pigment components without using excessive amounts of laser light energy, is very advantageous and allows the present systems to be used very effectively with a large variety of base substrate components.

In one embodiment, the present filler pigment components further include a material, other than the combined metal component and the glass forming component, effective to further enhance the durability of the color of the colored glass-like pigment component. Again, without wishing to limit the invention to any particular theory of operation, it is believed that this "durability" material acts to further stabilize or toughen the colored glass-like pigment component so that it is less susceptible to being altered, for example, by ambient conditions.

In one embodiment, the present filler pigment components include a transition metal component, other than the combined metal component and the glass forming component, in an amount effective to, as a result of being exposed to light energy from a laser, enhance the color of the colored glass-like pigment component relative to a substantially similar colored glass-like pigment component produced from a substantially identical filler pigment component without the transition metal component. Without wishing to limit the invention to any particular theory of operation, it is believed that this transition metal component, or a residue thereof, acts in the colored glass-like pigment component to impart a suitable or desired color to the colored glass-like pigment component.

In a useful embodiment, substrates useful for being marked by light energy from a laser comprise a base substrate component, as described elsewhere herein, and a filler pigment component coupled to the base substrate component which includes a white metal oxide component coated with a colored glass forming component. Particularly useful colored glass forming components include one or more metal, for example, transition metal, silicates, tungstates, molybdates, phosphates, phosphosilicates, molybdosilicates, tungstosilicates, borates, chromates and vanadates and the like. Examples of metals combined in the colored glass forming components include barium, copper, cobalt, nickel, iron, lead, manganese, chromium and the like and mixtures thereof. Examples of specific colored glass forming components include copper silicate, cobalt silicate, nickel silicate, iron silicate, manganese silicate, chromium silicate, copper tungstate, nickel tungstate, chromium molybdate, manganese phosphate, copper phosphosilicate, iron molybdosilicate, copper tungstosilicate, lead vanadate, barium chromate, copper borate and the like and mixtures thereof. The filler pigment component is present in an amount effective to, as a result of exposing the substrate to light energy from a laser, produce a colored glass-like pigment coupled to the base substrate component having a contrasting color relative to the filler pigment component.

One of the important features of the present invention is that a relatively large variety of base substrate components may be employed. One substantial application for the present invention is providing insulated electrical wires which are markable by light energy from a laser. Another significant class of base substrate components are printing media, for example, polymeric films, paper sheets and rolls, other paper forms and the like. In one embodiment, the base substrate component is a polymeric material, for example, any suitable polymeric material which is not substantially adversely affected by the amount of laser light energy required to produce the colored glass-like pigment component described herein.

The combined metal component is preferably a major amount, that is at least about 50% by weight, of the filler pigment component. In a more preferred embodiment, the combined metal component is at least about 70% by weight and still more preferably at least about 80% or at least about 90% by weight of the filler pigment component. A particularly useful combined metal component is titanium dioxide.

In another broad aspect of the present invention, methods for selectively marking a substrate are provided. These methods comprise exposing a selected portion of a substrate to light energy from a laser, thereby marking the selected portion of the substrate. The substrates useful in the present methods comprise a base substrate component and a filler pigment component coupled to the base substrate component and including a combined metal component and a glass forming component other than the combined metal component. The filler pigment component is present in an amount effective to, as a result of the above-noted exposing step, to produce a colored glass-like pigment component coupled to the base substrate component having a contrasting color relative to the filler pigment component. Preferably, the exposing step is effective to produce this colored glass-like pigment on the selected portion of the substrate. In one embodiment, the light energy is ultraviolet light or UV energy. In addition, the present substrates (in contrast to substrates pigmented with titanium dioxide without a glass forming component) respond well to marking, that is are effectively marked, using visible laser light, such as about 532 mm from a doubled frequency YAG laser. Titanium dioxide without the glass forming component responds mostly to marking with UV light. The colored glass-like pigment component coupled to the base substrate component preferably provides a contrasting color relative to the filler pigment component which is at least about 60%, more preferably at least about 70%, and still more preferably at least about 80%, of the maximum potential contrasting color obtainable from the filler pigment component.

The substrates described herein may be employed in the present methods of marking substrates.

These and other aspects and advantages of the present invention will become apparent in the following detailed description, examples and claims.

DETAILED DESCRIPTION OF THE INVENTION

The present substrates include a base substrate component and a filler pigment component coupled to the base substrate component. The filler pigment component includes a combined metal component and a glass forming component having a composition other than the combined metal component. The filler pigment component is present in an amount effective to, as a result of exposing the substrate to light energy from a laser, produce a colored, for example, having a color contrasting with the unexposed filler pigment component, glass-like pigment component coupled to the base substrate component.

As used herein, the term "glass-like" refers to a pigment component which has a combination of properties, that is two or more properties, of a glass. For example, such "glass-like" pigment components may have a molecular structure and/or crystal structure resembling or similar to that of a glass. Also, the "glass-like" pigment component may display a surface sheen or shininess which is similar to the surface effect displayed by various glasses. In addition, just as a glass is formed by the vitrication of its precursor materials, the present "glass-like" pigment component is preferably formed by the partial or substantially complete vitrification of the glass-forming component.

The glass-like pigment component preferably has a darker color and/or a higher contrast relative to the color and contrast produced as a result of identically exposing to light energy from a laser a substantially identical substrate including the filler pigment component without the glass-forming component. This preferred darker color and/or higher contrast may also be used to at least partially define, or even fully define, the colored glass-like pigment component, for example, relative to a pigment component formed without the presently useful glass-forming component.

In a very useful embodiment, the colored glass-like pigment component provides a contrasting color relative to the filler pigment component which is at least about 60%, more preferably at least about 70% and still more preferably at least about 80%, of the maximum potential contrasting color obtainable from the filler pigment component.

In a particularly useful embodiment, the inclusion of the presently useful glass forming component in a substrate reduces or lowers the threshold marking fluence, that is the minimum light energy per unit area needed to mark a substrate, of the substrate and/or increases the threshold ablation or decomposition fluence, that is the minimum light energy per unit area needed to ablate or decompose a substrate, of the substrate relative to a substantially identical substrate including the filler pigment component without the glass forming component. This feature of the present invention allows effective marking of the substrate using light energy from a laser while reducing, or even eliminating, the risk that the laser light energy will ablate, decompose or otherwise degrade the substrate.

More preferably, the glass forming component reduces the threshold marking fluence of the substrate by an amount in the range of about 20% to about 80% and/or increases the threshold ablation fluence of the substrate by an amount in the range of about 20% to about 200%, relative to a substantially identical substrate without the glass forming component.

Preferably, the colored glass-like pigment component has enhanced color stability relative to the color stability produced as a result of identically exposing to light energy from a laser a substantially identical substrate including the filler pigment component without the glass forming component.

As used herein, the term "combined metal component" refers to one or more compounds which include a metal combined with one or more elements. An example of a combined metal component is titanium oxide. Any suitable combined metal component may be employed in accordance with the present invention provided that it functions as described herein and has no substantial detrimental effect, for example, on the base substrate component or the other components included in the present substrates. In one useful embodiment, the combined metal component is selected from metal oxides, other inorganic metal compounds, organometallic compounds and mixtures thereof.

Very useful combined metal components include iron oxides, cobalt oxides, tungsten oxides, molybdenum oxides, vanadium oxides, zinc oxide, barium oxide, calcium oxide, antimony oxides, titanium oxides, copper oxides, lead oxides, tin oxide (stannic oxide), thallium oxides, bismuth oxides, tantalum oxides, niobium oxides, thorium oxides, lanthanum oxides, zinc sulfide, cadmium sulfide, cadmium selenide, barium sulfate, calcium sulfate, lead sulfate and combinations thereof, such as combined oxides of Ni, Sb and Ti, combined oxides of Cr, Sb and Ti, combined oxides of Fe, Al and Ti, combined oxides of Fe, Cr, Zn and Ti, combined oxides of Fe, Zn and Ti, combined oxides of Fe and Ti, combined oxides of Mn, Sb and Ti, combined oxides of Cr, Ni, Cu, Sb and Ti, combined oxides of Cu and Cr, combined oxides of Co, Cr, Mg, Al and Zn, combined oxides of Co, Zn, Ti and Cr, combined oxides of Ni, Co, Zn, Sb and Ti, combined oxides of Ni, Co, Zb and Ti, combined oxides of Ni and W, combined oxides of Mn, Cr, Sb and Ti, combinations of CdS, ZnS and $BaSO_4$, combinations of CdS and $BaSO_4$, combinations of CdS and CdSe, combinations of CdS, CdSe and $BaSO_4$, lead chromate, barium chromate, cobalt titanate, lead molybdate, lead tungstate, combinations of lead chromate, lead molybdate and lead sulfate and the like and combinations thereof and mixtures thereof.

The filler pigment component, which includes both the combined metal component and the glass-forming component is present in an amount effective to, as a result of exposing the substrate to light energy from a laser, produce a colored glass-like pigment component coupled to the base substrate component, which colored glass-like pigment component preferably has a contrasting color relative to the filler pigment component. The specific amounts of filler pigment component and the individual combined metal component and glass forming component included in the filler pigment component used vary over relatively broad ranges and are not critical to the present invention. These amounts vary based on many factors, such as the specific base substrate component employed, the specific combined metal component employed, the specific glass-forming component employed, the application involved and the like factors. In one useful embodiment, the filler pigment component is present in an amount in the range of about 0.5% to about 20% by weight of the substrate, that is the combined base substrate component and filler pigment component. The combined metal component is preferably in an amount in the range of about 10% to about 90% by weight of the filler pigment component and the glass-forming component is preferably present in an amount in the range of about 10% to about 90% by weight of the filler pigment component. It is important that the glass-forming component be present in an amount effective to produce the colored glass-like pigment component.

The glass-forming component utilized in the present invention may be selected from any suitable such component provided that such glass-forming component functions as described herein and has no substantial detrimental effect on the base substrate component or on the other components present in the present substrates. Preferred glass forming components include those selected from oxides, such as silicon oxide, boron oxide, germanium oxides, phosphorus oxides, e.g., phosphorus pentoxide, thorium oxides, lanthanum oxides, titanium oxides, lead oxides, arsenic oxides, antimony oxides, vanadium oxides, tantalum oxides, other metal oxides and the like; silicates, such as aluminum silicate, copper silicate, lead silicate, other metal silicates and the like; phosphates, such as aluminum phosphate, zinc phosphate, stannic phosphate, nickel phosphate, other metal phosphates and the like; borates, such as aluminum borate, copper borate, zinc borate, chromium borate, other metal borates and the like; molybdates, such as copper molybdate, zinc molybdate, other metal molybdates and the like; tungstates, such as copper tungstate, lead tungstate, barium tungstate, other metal tungstates and the like; vanadates, such as lead vanadate, other metal vanadates and the like; chromates, such as lead chromate, zinc chromate, manganese chromate, other metal chromates and the like; and the combinations thereof, such as metal tungstosilicates, metal phosphosilicates, metal molybdosilicates, metal phosphotungstates, metal phosphomolybdates, and the like; organosilicon compounds, organoboron compounds, organophosphorus compounds and the like; and mixtures thereof.

The specific combined metal component being employed may influence the choice of glass-forming component to be employed and/or the relative ease with which a suitable glass-like pigment component is formed. A number of the combined metal components are also useful (though not in the same substrate) as a glass-forming component. Silica is a very useful glass-forming component, although it is not the best glass-forming component for every combined metal component. Examples of combinations of combined metal components and glass-forming components which form glass-like pigment components easily are:

| Combined Metal Component | Glass-Forming Component |
|---|---|
| Oxides of: | |
| Thallium | Silicon Components |
| Lead | Germanium Components |
| Bismuth | |
| Oxides of: | |
| Tantalum | Silicone Components |
| Niobium | |
| Oxides of: | |
| Vanadium | Phosphorus Components |
| Molybdenum | |
| Tungstun | |
| Oxides of Titanium | Tantalum Components |
| | Thorium Components |
| | Lanthanum Components |
| Oxides of: | |
| Thorium | Titanium Components |
| Tungstun | |
| Lanthanum | |

Combinations of titanium dioxide and tantalum pentoxide, for example, 70% by weight titanium dioxide and 30% by weight tantalum pentoxide, are effective.

The base substrate component employed in the present invention may be any suitable such substrate which functions as described herein. For example, the present substrates may include an electric wire with the base substrate component providing insulation for the electric wire. In general, the base substrate component may be any suitable printing medium. In a very useful embodiment, the base substrate component is a polymeric material. Useful polymeric materials can be of natural or, preferably, synthetic origin. The following is a list of various polymeric materials which may be employed as base substrate components. These polymeric materials include: polyolefins such as polyethylene, polypropylene, polyisobutylene, polystyrene and the like, polyvinyl chloride, polyvinylidene chloride, polyvinyl acetate polyacrylonitrile, polyacrylates, polymethacrylates, polybutadiene and copolymers of the monomers thereof, in particular acrylonitrile-butylene-styrene (ABS) polymers and ethylene-vinyl acetate (EVA) polymers, polyesters of aromatic polycarboxylic acids and polyfunctional alcohols, polyamides, polyimides, polycarbonates, polyurethanes, polyethers such as polyphenylene oxide, polyacetals, the condensates of formaldehyde and phenols (phenolic plastics), the condensates of formaldehyde and urea, thiourea and melamine (aminoplasts), the polyadducts and polycondensates of epicholorohydrin and diols or polyphenols known as epoxy resin, saturated polyesters, for example alkyd resins, unsaturated polyesters, for example maleic resins and the like and mixtures thereof. It must be emphasized that not only the homopolymers can be used in the practice of this invention, but also mixtures of plastics, as well as co-condensates and copolymers may also be employed.

In a further useful embodiment of the present invention, the filler pigment component further includes a durability material other than the combined metal component and the glass-forming component in an amount effective to enhance the durability or long term usefulness of the colored glass-like pigment.

Without wishing to limit the invention to any particular theory of operation, it is believed that the presently useful durability components combine in the glass-like pigment component to make such glass-like pigment component more permanent or less susceptible to being destroyed. Any suitable durability material which functions as described herein and has no substantial detrimental effect on the remainder of the filler pigment component, or the other components of the present substrates, may be employed. Such durability materials are preferably chosen from materials which can be combined with the remainder of the filler pigment component to form glasses, for example, through vitrification. Particularly useful examples of durability materials include one or more aluminum-containing compounds, such as alumina, aluminum hydroxide, aluminum silicate, aluminum borate, aluminum phosphate, cobalt aluminate, copper aluminate, nickel aluminate, zirconium oxide, zirconium phosphate, zirconium silicate and the like and mixtures thereof. The amount of durability material used, if any, varies and depends on many factors, such as those factors described previously with regard to the filler pigment component, and the specific durability material being employed. Preferably, the durability material is present in the range of about 10% to about 50% of the glass forming component.

In one very useful aspect of the present invention, substrates suitable for being marked by light energy from a laser comprise a base substrate component, as described herein, and a filler pigment coupled to the base substrate component and including a white metal oxide component coated with a colored glass-forming component. The filler pigment component is present in an amount effective to, as a result of exposing the substrate to light energy from a laser, produce a colored glass-like pigment component coupled to the base substrate component having a contrasting color relative to the filler pigment component. Particularly useful colored glass forming components include one or more metal, for example, transition metal, silicates, tungstates, molybdates, phosphates, phosphosilicates, molybdosilicates, tungstosilicates, borates, chromates and vanadates and the like. Examples of metals combined in the colored glass forming components include barium, copper, cobalt, nickel, iron, lead, manganese, chromium and the like and mixtures thereof. Examples of specific colored glass forming components include copper silicate, cobalt silicate, nickel silicate, iron silicate, manganese silicate, chromium silicate, copper tungstate, nickel tungstate, chromium molybdate, manganese phosphate, copper phosphosilicate, iron molybdosilicate, copper tungstosilicate, lead vanadate, barium chromate, copper borate and the like and mixtures thereof. The filler pigment component is present in an amount effective to, as a result of exposing the substrate to light energy from a laser, produce a colored glass-like pigment coupled to the base substrate component having a contrasting color relative to the filler pigment component.

Any suitable method for coating a pigment, such as a white metal oxide, with a glass-forming component may be employed and is included within the scope of the present invention. The resulting filler pigment components from these different methods may not respond to laser energy in the same way, even though they have the same overall composition.

Two particularly useful pigment coating methods are described herein with respect to placing a coating of silica on titanium dioxide pigment. However, other glass-forming components and metal oxide components may be employed.

In the first method, a water soluble silicate, such as sodium silicate, is dissolved into water. A powered titanium dioxide pigment is mixed into the sodium silicate solution to obtain a slurry. The sodium silicate solution is highly alkaline. When the slurry is neutralized with an acid, such as hydrogen chloride, silica precipitates from the solution and sodium chloride remains in the solution. The slurry containing titanium dioxide pigment and sodium silicate is neutralized with hydrogen chloride to precipitate silica which coats the titanium dioxide pigment particles. These coated particles are recovered and dried to form the presently useful filler pigment component.

In a second method, for example, the sol gel method, an organosilicon compound is used. This organosilicon compound has a general formula selected from $SiX_4$, $RSiX_3$, $R_2SiX_2$ and mixtures thereof, with each R being independently selected from hydrocarbyl groups and substituted hydrocarbyl groups, and each X being independently selected from hydrolyzable groups, such as alkoxy, for example, ethoxy. The organosilicon compound is dissolved in an organic solvent, such as ethanol and the like, and the solution is mixed with water. In the presence of water in an acidic environment, the organosilicon compound hydrolyses and forms silicic acid which condenses to form a silica network. In this case, the Si—O— moiety bonds strongly to the surface of the titanium dioxide particles, for example, to form Si—O—Ti bonds.

Additionally, the glass-forming component and the combined metal component can be mixed together and then calcined at an elevated temperature, for example, in the range of about 600° C. to about 1300° C., depending on the nature of the materials being employed, for a sufficient time, for example, on the order of about 0.1 hour to about 10 hours, to form the filler pigment component.

In some pigments, such as titanium dioxide coated with silica, both methods provide at least somewhat similar results. In other cases, however, this may not be true. For example, a pigment composed of the oxides of nickel, antimony and titanium (yellow color) coated with silica by an inorganic silicate (the first method described above) yields a material with laser marking characteristics which are not very different than an identical pigment without silica coating. However, when the same pigment is coated with silica using tetraethyl orthosilicate, the resulting pigment requires 30% less energy for marking relative to an identical pigment without silica coating.

Without wishing to limit the invention to any particular theory of operation, it is believed that the strong chemical bond between the glass-forming component and the metal oxide pigment, in the second method described above, requires lower energy for marking. Therefore, this second method is a preferred embodiment for producing the present substrates.

The following non-limiting examples illustrate certain aspects of the present invention.

EXAMPLE 1

A pigment is prepared as follows. A quantity of sodium borate is dissolved in water (clear liquid). A powdered stannic oxide (white) pigment is introduced into the solution. The resulting aqueous mixture is neutralized with a solution of copper chloride to precipitate copper metaborate onto the stannic oxide particles. Coated particles are recovered, washed and dried at 110° C. for 1 hour and 300° C. for 8 hours. The resulting combination pigment, containing 20% by weight of CuO and 18% by weight of $B_2O_3$, has a bluish green color.

An epoxy resin, sold under the trademark Caldofix by Struers (Copenhagen/Denmark), is used as the substrate for the combination pigment. This epoxy resin (without pigment) is transparent or clear. The curing agent (six parts by weight for twenty parts by weight of resin) is mixed with the resin precursor to form a pre-cure mixture. The combination pigment is blended uniformly into the pre-cure mixture. The resulting blend is placed in a mold and cured at 60° C. for 3 hours. The resulting molded product is tested for markability.

A Nd YAG laser, sold under the trademark Series 100 by Quantronix, operating at a wavelength of 532 mm (green) is used to mark the molded product. The beam of the laser which has a guassian profile is focused to produce an approximately 0.25 mm spot on the molded product. The amount of energy needed to mark the product is monitored. It is found that the laser is effective to produce markings on the molded product which are of high contrast and substantial durability.

A similar molded product is produced except that the uncoated stannic oxide particles are used directly as the pigment. It is found that the molded product containing the coated pigment in accordance with this invention can be marked with about 30% of the light energy which is needed to mark the molded product with the uncoated stannic oxide.

EXAMPLE 2

A pigment is prepared as follows. A quantity of sodium meta silicate and vanadium pentoxide is dissolved in water. A powdered titanium dioxide (white) pigment is introduced into the solution to form a slurry. The slurry is neutralized with aluminum sulfate to precipitate the mixed coating onto the titanium dioxide particles. Coated particles are recovered, washed and dried at 110° C. for 1 hour then heated to 300° C. for 2 hours and to 650° C. for 30 minutes. The resulting combination pigment, containing 12% by weight of $Al_2O_3$, 15% by weight of $SiO_2$ and 4% by weight of $V_2O_5$, has a bright orange color.

Using this combination pigment, a pigmented molded product is prepared and tested for markability substantially as described in Example 1.

It is found that the laser is effective to produce markings on the molded product which are of high contrast and substantial durability.

A similar molded product is produced except that the uncoated titanium dioxide particles are used directly as the pigment. It is found that the molded product containing the coated pigment in accordance with this invention can be marked with about 50% of the light energy which is needed to mark the molded product with the uncoated titanium dioxide.

EXAMPLE 3

A pigment is prepared as follows. A quantity of sodium silicate is dissolved in water. A powdered stannic oxide (white) pigment is introduced into the solution to form a slurry. The slurry is neutralized by the addition of hydrochloric acid to precipitate silica onto the stannic oxide particles. Coated particles are recovered, washed and dried at 110° C. for 1 hour and at 300° C. for 8 hours. The resulting combination pigment, containing 43% by weight of silica, is white in color.

Using this combination pigment, a pigmented molded product is prepared and tested for markability substantially as described in Example 1.

It is found that the laser is effective to produce markings on the molded product which are of high contrast and substantial durability.

A similar molded product is produced except that the uncoated stannic oxide particles are used directly as the pigment. It is found that the molded product containing the coated pigment in accordance to this invention can be marked with about 50% of the light energy which is needed to mark the molded product with the uncoated stannic oxide.

EXAMPLE 4

A pigment is prepared by the sol gel method as follows. A quantity of tetraethyl orthosilicate (TEOS) is mixed with ethanol. A powdered molybdenum trioxide (white) pigment is introduced into the mixture. The TEOS is hydrolyzed by the addition of a predetermined amount of water and a minor amount of hydrochloric acid to form a network of silica encapsulating the pigment. The resulting material is dried and ground to a fine powder. The resulting combination pigment has a slightly off white color.

Using this combination pigment, a pigmented molded product is prepared and tested for markability substantially as described in Example 1.

It is found that the laser is effective to produce markings on the molded product which are of high contrast and substantial durability.

A similar molded product is produced except that the uncoated molybdenum trioxide particles are used directly as the pigment. It is found that the molded product containing the coated pigment in accordance to this invention can be marked with about 75% of the light energy which is needed to mark the molded product with the uncoated molybdenum trioxide.

EXAMPLE 5

A combination pigment composed of BaO, CaO, CoO and $B_2O_3$ is prepared. A quantity of sodium borate is dissolved in water. A powdered calcium sulfate (white) pigment is added to the solution, which is then neutralized with cobalt chloride and barium chloride to precipitate cobalt borate and barium borate onto the pigment. The coated particles are recovered, washed and dried at 110° C. for 2 hours and 300° C. for 8 hours. The color of the combined pigment is dark gray as a powder.

Using this combination pigment, a pigmented molded product was prepared and tested for markability substantially as described in Example 1. In the polymer, the pigment is black in color.

It is found that the combination pigment discolors to white when exposed to laser light.

EXAMPLE 6

A pigment is prepared as follows. A quantity of sodium silicate is dissolved in water. A powdered (red) pigment made up of CdS and CdSe is introduced into the solution to form a slurry. The slurry is neutralized by the addition of hydrochloric acid to precipitate silica onto the pigment particles. Coated particles are recovered, washed and dried at 110° C. for 1 hour and 300° C. for 8 hours. The resulting combination pigment has a red color, much like the original pigment.

Using this combination pigment, a pigmented molded product is prepared and tested for markability substantially as described in Example 1.

It is found that the laser is effective to produce markings on the molded product which are of high contrast and substantial durability.

A similar molded product is produced except that the uncoated CdS/CdSe particles are used directly as the pigment. It is found that the molded product containing the coated pigment in accordance to this invention can be marked with about the same amount of the light energy which is needed to mark the molded product with the uncoated CdS/CdSe. However, the amount of energy required to ablate the combination pigment is advantageously higher, for example, about 75% higher, than the amount of energy needed to ablate the uncoated pigment.

EXAMPLE 7

A pigment is prepared as follows. A quantity of nickel oxide, zinc oxide, titanium dioxide and cobalt carbonate are blended together and calcined at 1100° C. for 1 hour. The resulting pigment is green and is found to contain approximately 34% by weight of $TiO_2$, 16% by weight of CoO, 32% by weight of NiO and 18% by weight of ZnO. A quantity of sodium phosphate tribasic is dissolved in water. The above-noted powdered green pigment is introduced into the solution to form a slurry. The slurry is neutralized with calcium chloride to precipitate calcium phosphate and coat the pigment particles. Coated particles are recovered, washed and dried at 110° C. for 1 hour and at 300° C. for 8 hours. The resulting combination pigment has a green color.

Using this combination pigment, a pigmented molded product is prepared and tested for markability substantially as described in Example 1.

It is found that the laser is effective to produce markings on the molded product which are of high contrast and substantial durability.

A similar molded product is produced except that the uncoated oxide particles are used directly as the pigment. It is found that the molded product containing the coated pigment in accordance to this invention can be marked with about 60% of the light energy which is needed to mark the molded product with the uncoated oxide pigment.

While this invention has been described with respect to various specific examples and embodiments, it is to be understood that the invention is not limited thereto and that it can be variously practiced within the scope of the following claims.

What is claimed is:

1. A substrate suitable for being marked by light energy from a laser comprising:

a base substrate component; and a filler pigment component coupled to said base substrate component and including a white metal oxide component coated with a colored glass forming component effective to produce a colored glass-like pigment component in combination with said white metal oxide component and being selected from the group consisting of metal tungstates, metal phosphates, metal phosphosilicates, metal molybdosilicates, metal tungtosilicates metal borates, metal vanadates and mixtures thereof, said filler pigment component being present in an amount effective to, as a result of exposing said substrate to light energy from a laser, produce the colored glass-like pigment component coupled to said base substrate component having a contrasting color relative to said filler pigment component.

* * * * *